Aug. 30, 1932.  H. FRÖHLICH ET AL  1,874,954
INDUCTION METER
Original Filed Dec. 20, 1929
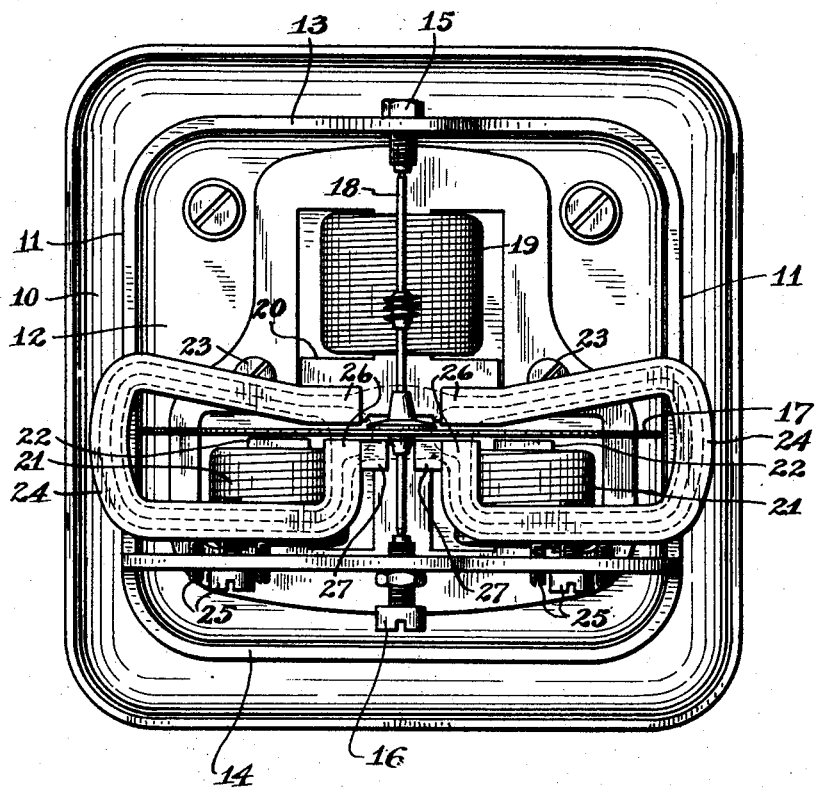
INVENTORS
Hans Fröhlich
Theodor Hansch
BY John D. Magan
ATTORNEY Patented Aug. 30, 1932

1,874,954

UNITED STATES PATENT OFFICE

HANS FRÖHLICH AND THEODOR HAUSCH, OF ZUG, SWITZERLAND, ASSIGNORS TO LANDIS & GYR, A.-G., OF ZUG, SWITZERLAND, A CORPORATION OF SWITZERLAND

INDUCTION METER

Application filed December 20, 1929, Serial No. 415,583, and in Switzerland January 9, 1929. Renewed December 12, 1931.

The present invention relates to a new and useful induction meter, and more particularly to improvements in the temperature compensation of induction meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

The single figure of the drawing is a front elevation of the present preferred embodiment of the invention and illustrative of the invention.

The present invention has for its object the provision of an induction meter provided with means for compensating for the temperature error of the meter, as well as the provision of a temperature compensated induction meter which can be easily assembled and repaired, and in which the meter disc can be easily removed from or placed into metering position without disturbing the adjustment of the other parts of the meter. The invention also provides for the elimination of the temperature error of induction meters by varying the braking force applied to the meter disc in accordance with temperature, thereby compensating for the variations of the driving force applied to the disc and resulting from a change in temperature.

Referring now in detail to the present preferred embodiment of the invention as illustrated by the accompanying drawing, the invention is shown as applied to a conventional form of induction meter having a back plate 10 of the meter casing, on which the meter frame 11 is securely fastened and supported in running position. The meter frame 11, in the present embodiment, comprises an intermediate portion 12, from which extend the upper and lower reaches 13 and 14 of the frame, parallel to each other and at right angles to the intermediate portion 12. The upper and lower reaches 13 and 14 of the frame are provided with bearings 15 and 16 by which the meter disc 17 and spindle 18 are rotatably supported.

The driving system, for rotating the metering disc proportionately to the energy consumed in the circuit, in the present embodiment comprises a voltage coil 19 and core 20, and current coils 21 and cores 22, securely fastened to the intermediate portion of the meter frame by means of screws 23. The voltage core 20 and current cores 22 are spaced apart, and as usual, are so positioned that the rear edge of the meter disc 17 projects into the space between the cores and the disc is driven thereby.

For controlling the rotation of the metering disc, there are provided a pair of braking magnets 24 adjustably supported on the lower reach 14 of the meter frame by means of adjusting screws 25, and are positioned with respect to the meter disc 17 so that one pole of each braking magnet 24 lies on each side of the meter disc 17. According to the present invention, the air gaps of the braking magnets 24 are relatively close together, but are sufficiently spaced apart, and the clear space of the magnets is sufficiently large to permit the meter disc 17 and spindle 18 to be bodily moved into position, or removed therefrom, through the space between the air gaps, thereby avoiding the necessity of disturbing the adjustment of the braking magnets or other meter parts, or of disassembling the disc and spindle.

According to the present invention, means are also preferably provided for varying the permeability of the air gap of each of the braking magnets in accordance with the temperature, to compensate for the temperature error of the meter which would otherwise be present, and for this purpose, there is preferably provided a metal piece or block 27, secured to one of the pole pieces 26 of each of the braking magnets 24. This compensating block 27 is formed of a temperature responsive alloy, of which the coefficient of permeability decreases as its temperature rises, and for this purpose, a copper-nickel alloy having these properties is preferably employed. As shown in the accompanying drawing, these compensating blocks are preferably secured directly to one of the pole pieces of each braking magnet, and preferably both blocks of alloy are located on the same side of the meter disc 17 and project from each braking magnet 24 towards each other, leaving a relatively small air gap between the magnets and compensating blocks, through which the spindle 18 can be passed.

According to our present understanding of the invention, which is supported by extensive experiments, a shunt is established across the pieces of alloy 27, and the air gap between them, the permeability of this shunt depending on the material of which the pieces 27 are composed, and varies with the temperature, thereby causing a variation in the magnitude of the braking flux applied to and acting on the meter disc 17. In addition to this variation in the braking flux, there is produced a desirable alteration in the distribution of the braking flux, by reason of the displacement of the braking flux passing through the meter disc, by the alloy pieces attached to the braking magnets.

The arrangement of the alloy pieces attached to the braking magnets is also advantageous and facilitates the assembly of the meter, as the braking magnets may be adjusted to the desired position without destroying the shunt between the magnets.

The invention in its broader aspects is not limited to the specific mechanisms shown and described but departures may be made therefrom within the scope of the accompanying claims without departing from the principles of the invention and without sacrificing its chief advantages.

What we claim is:

1. In an induction meter, a meter disc and spindle, a meter frame, driving magnets for rotating the disc, a pair of braking magnets having their air gaps adjacent to each other, said magnets extending in opposite directions away from each other, and blocks of alloy attached to one pole piece of each magnet, said alloy having its permeability varying in accordance with temperature, said magnets and alloy blocks being spaced from each other sufficiently to permit passage of the spindle through the space between the magnets and of the disc through the air gaps without disturbing either the driving magnets or braking magnets.

2. In an induction meter, a meter disc and spindle, a meter frame, driving magnets for rotating the disc, a pair of braking magnets having their air gaps adjacent to each other, said magnets extending in opposite directions away from each other and being located on the other side of the spindle from the driving magnets, and means for varying the distribution of the breaking flux through the disc comprising blocks of alloy attached to a pole piece of each braking magnet, said alloy having its permeability varying in accordance with temperature, said magnets and alloy blocks being spaced from each other only sufficiently to allow passage of the spindle through the space between the magnets, whereby the disc and spindle can be removed and replaced without disturbing the adjustment of the braking or driving magnets.

In testimony whereof, we have signed our names to this specification.

HANS FRÖHLICH.
THEODOR HAUSCH.